(12) United States Patent
Wang et al.

(10) Patent No.: US 8,422,021 B2
(45) Date of Patent: Apr. 16, 2013

(54) ALL-FIBER INTERFEROMETRIC FIBER OPTIC GYROSCOPE FOR INHIBITING ZERO DRIFT

(75) Inventors: Xinyue Wang, Beijing (CN); Changhong He, Beijing (CN); Ziyu Wang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 13/042,370

(22) Filed: Mar. 7, 2011

(65) Prior Publication Data

US 2012/0092676 A1  Apr. 19, 2012

Related U.S. Application Data

(63) Continuation of application No. PCT/CN2010/001622, filed on Oct. 15, 2010.

(51) Int. Cl.
*G01C 19/72* (2006.01)

(52) U.S. Cl.
USPC .......................................................... 356/461

(58) Field of Classification Search .................. 356/461, 356/473–476
See application file for complete search history.

(56) References Cited

U.S. PATENT DOCUMENTS

| | | | |
|---|---|---|---|
| 4,456,376 A | * | 6/1984 | Carrington et al. ............ 356/464 |
| 4,728,192 A | * | 3/1988 | Shaw et al. .................... 356/464 |
| 5,333,047 A | * | 7/1994 | Toyama et al. ................ 356/460 |
| 5,610,714 A | * | 3/1997 | Malvern et al. ............... 356/463 |
| 5,767,968 A | * | 6/1998 | Strandjord .................... 356/460 |

OTHER PUBLICATIONS

Wang, et al., "Method for suppressing the bias drift of Interferometric all-fiber optic gyroscopes," Optics Letters, vol. 36(7), pp. 1191-1193 (2011).
Wang, et al., "Revised minimum reciprocity configuration and actualization methodology of interferometric all-fiber optic gyroscopes," Applied Optics, vol. 50(13), pp. 1856-1860 (2011).
Zhang, G., "The Principles and Technologies of Fiber-Optic Gyroscope," National Defense Industry Press (May 2008), 5 pages.
Lefevre, H., "The Fiber-Optic Gyroscope," Glasgow, Scotland (Jun. 1992), 7 pages (Artech House—Boston, MA).

* cited by examiner

*Primary Examiner* — Tarifur Chowdhury
*Assistant Examiner* — Jonathon Cook
(74) *Attorney, Agent, or Firm* — Perkins Coie LLP

(57) ABSTRACT

A method for inhibiting zero drift of an all-fiber interferometric fiber optic gyroscope and a corresponding all-fiber interferometric fiber optic gyroscope are disclosed. The method comprises: reversing the polarity of an AC voltage applied to a PZT piezoelectric ceramic phase modulator according to a predetermined half-cycle time period, and making half of the difference between output rotation rates of the gyroscope in two adjacent half-cycle time periods as the output rotation rate of the gyroscope in a cycle. A phase reversal switch and a DSP chip are added to the all-fiber interferometric fiber optic gyroscope. The phase reversal switch is used for controlling the polarity of the AC voltage, and the DSP chip is used for outputting a square wave signal to control the phase reversal switch and for calculating the output rotation rate of the gyroscope according to the output signal of a demodulation/amplifier circuit.

9 Claims, 3 Drawing Sheets

ALL-FIBER INTERFEROMETRIC FIBER OPTIC GYROSCOPE FOR INHIBITING ZERO DRIFT

This is a continuation of International Patent Application No. PCT/CN2010/001622, filed on Oct. 15, 2010 under the Patent Cooperation Treaty (PCT).

FIELD OF THE INVENTION

The present invention relates to all-fiber interferometric fiber optic gyroscopes, and in particular, it relates to technology for inhibiting zero drift of all-fiber interferometric fiber optic gyroscopes, which pertains to the technical field of fiber optic sensing.

DESCRIPTION OF THE RELATED ART

A gyroscope is an instrument for measuring angular velocity-angular displacement in inertial space, and its history can be traced back to thousands of years ago. Mechanical gyroscope, laser gyroscope and fiber-optic gyroscope are respectively called first, second and third generation gyroscopes. Fiber optic gyroscopes emerged in 1976 and mass production thereof was launched in the 1990s. The all-fiber interferometric fiber optic gyroscope is an important variety in the family of fiber optic gyroscope, and it is widely applicable in the fields of navigation, guidance, positioning, automatic north seeking, damping on vibration for trains or ships, orientation of antenna aiming systems, measurement of oil/mine well or tunnel deviation, inspection of distortion and vibration of large-scale construction, automatic control, etc.

An interferometric fiber optic gyroscope has two basic configurations, namely, all-fiber configuration and optical-waveguide/fiber-hybrid configuration, i.e., the open loop and closed loop configurations as we also call them. Even when a fiber optic gyroscope is stationary or rotating at a constant velocity, the output angular velocity of the gyroscope may have a slow undulation of a certain amplitude, which is the so-called "zero drift" (also called "bias drift"). Zero drift may be caused by thermal sensitivity of the gyroscope components and/or other dynamic sources of error. The advantages of the interferometric fiber optic gyroscope are a simple structure and low cost, and its disadvantage is that its zero drift is relatively large. How to overcome or inhibit the zero drift of an interferometric fiber optic gyroscope is an issue of significant concern.

The configuration of a traditional all-fiber open loop interferometric fiber optic gyroscope is shown in FIG. 1A, wherein the elements include: a superluminescent diode 1, a photodetector diode 2, a light source coupler 3, a polarizer 4, a fiber optic loop coupler 5 and a fiber optic loop 6. According to FIG. 1A, the operation principle of the typical all-fiber interferometric fiber optic gyroscope is: polarized light (elliptically or circularly polarized light) emitted from the super-luminescent diode 1 is input into port A of the light source coupler 3 and is split into two beams of polarized light; wherein the beam of polarized light which travels along a transmission arm and is output from port C is input into the polarizer 4; the polarizer 4 converts the input polarized light into linearly polarized light and inputs the linearly polarized light into port A of the fiber optic loop coupler 5. The fiber optic loop coupler 5 splits the input linearly polarized light into two beams and outputs them through ports C and D thereof; the linearly polarized light beams output from ports C and D of the fiber optic loop coupler 5 travel clockwise and counter-clockwise along the fiber optic loop 6, respectively, and then return to the fiber optic loop coupler 5 through ports C and D and excite a coherent superposition therein; after the coherent superposition, the linearly polarized light is again split into two beams by the fiber optic loop coupler 5 and are output from ports A and B of the fiber optic loop coupler 5. In the linearly polarized light output from port A of the fiber optic loop coupler 5: the linearly polarized light from port A traveling clockwise passes through each of the transmission arm and the coupling arm of the fiber optic loop coupler 5 once; and the linearly polarized light traveling counter-clockwise also passes through each of the transmission arm and the coupling arm of the fiber optic loop coupler 5 once. Therefore, the optical paths covered by the two beams of linearly polarized light which travel clockwise and counter-clockwise respectively from port A of the fiber optic loop coupler 5 are identical when they return to port A of the fiber optic loop coupler 5, and thus the linearly polarized light generated by their coherent superposition are called reciprocal light, and the port outputting the reciprocal light is called reciprocal port. However, in the linearly polarized light output through port B of the fiber optic loop coupler 5: the linearly polarized light traveling clockwise from port A of the fiber optic loop coupler 5 passes through the transmission arm of the fiber optic loop coupler 5 twice; and the linearly polarized light traveling counter-clockwise passes through the coupling arm of the fiber optic loop coupler 5 twice. Therefore, the optical paths covered by the two beams of linearly polarized light which travel clockwise and counter-clockwise respectively from port A of the fiber optic loop coupler 5 and reach port B of the fiber optic loop coupler 5 are different, and thus the linearly polarized light generated by their coherent superposition are called nonreciprocal light, and the port outputting the nonreciprocal light is called nonreciprocal port. Nonreciprocal light signal cannot be used as detection signal of fiber optic gyroscopes.

The linearly polarized light output through port A (the reciprocal port) of the fiber optic loop coupler 5 is input into port C of the light source coupler 3 through the polarizer 4, and the light source coupler 3 splits the linearly polarized light signal input through port C into two beams, wherein one beam is input into the photodetector 2 through port B thereof. When the fiber optic loop 6 is stationary, the optical paths covered by the two beams linearly polarized light which travel clockwise and counter-clockwise respectively from port A of the fiber optic loop coupler 5 are identical when they return to port A of the fiber optic loop coupler 5; and when the fiber optic loop 6 rotates, the optical paths covered by the two beams of linearly polarized light which travel clockwise and counter-clockwise respectively from port A of the fiber optic loop coupler 5 are different when they return to port A of the fiber optic loop coupler 5; and under said two circumstances, the intensity of the optical signal received by the photodetector 2 differs, and thus the angular velocity of the rotation of the fiber optic loop 6 can be calculated.

To enhance the detection sensitivity of the all-fiber fiber optic gyroscope, a PZT ceramic piezoelectric phase modulator 7 may be provided at an end of the fiber optic loop 6. The phase modulator is a disc-shaped ceramic sheet, which is called PZT disc for short. A very short section (about 1 meter) of the fiber optic loop 6 is wound around the outer circle of the PZT disc. When an AC voltage signal is applied to the PZT disc, the radius of the PZT disc will change with the AC voltage signal such that the length of the fiber optic loop 6 changes slightly. Since the optical signals traveling clockwise/counter-clockwise reach the PZT piezoelectric phase modulator 7 at different time, an AC signal can be detected at the photodetector diode 2, the frequency spectrum and magnitude of the AC signal changes correspondingly when the gyroscope is stationary or rotating, and the rotation rate of the gyroscope can be calculated according to said change. A demodulation/amplifier circuit 11 receives the output of the photodetector diode 2 and, based thereon, computes the output angular velocity of the gyroscope according to well-known formulas.

References: (1) Hervé C. Lefèvre, "The Fiber-Optic Gyroscope", Artech House, Boston, 1993; (2) The Principles and Technologies of Fiber-Optic Gyroscope, Zhang Guicai, National Defense Industry Press, 2008.

SUMMARY

This summary is provided to introduce in a simplified form certain concepts that are further described in the Detailed Description below and the drawings. This summary is not intended to identify essential features of the claimed subject matter or to limit the scope of the claimed subject matter.

Introduced here is a method for inhibiting zero drift of all-fiber interferometric fiber optic gyroscopes and a corresponding all-fiber interferometric fiber optic gyroscope.

According to the characteristics of the zero drift of the open loop interferometric fiber optic gyroscope—namely, that it (1) is independent of the rotation direction of the gyroscope, and (2) changes slowly—the present invention performs high speed phase reversal to an AC voltage signal applied to a PZT piezoelectric ceramic phase modulator, and meanwhile performs calculation to the output rotation rate signal such that the zero drift of the all-fiber interferometric fiber optic gyroscope is inhibited, and the technical indices of the gyroscope is greatly improved. The technique substantially reduces or eliminates the need to calibrate the gyroscope for zero drift.

The technique introduced here is realized in one embodiment by the following technical solution.

A method for inhibiting zero drift of an all-fiber interferometric fiber optic gyroscope, comprising: reversing the polarity of an AC voltage applied to a PZT piezoelectric ceramic phase modulator according to a predetermined half-cycle time period, and making a "final" output rotation rate of the gyroscope in a cycle equal to half of the difference between output rotation rates of the gyroscope in two adjacent half-cycle periods.

The switch of the polarity of the AC voltage can be realized by a phase reversal switch, i.e. the phase reversal switch is provided between an oscillator for generating the AC voltage and the PZT piezoelectric ceramic phase modulator, and the phase reversal switch periodically switches the polarity of the AC voltage applied to the PZT piezoelectric ceramic phase modulator. The aforesaid "high speed phase reversal" refers to the high speed switch by the phase reversal switch from one state to the other, whereas it does not involve the time period during which the phase reversal switch is kept in any state.

The present invention further includes an all-fiber interferometric fiber optic gyroscope adopting said zero drift inhibiting method. Like the prior art, the gyroscope also comprises a superluminescent diode, a light source coupler, a polarizer, a fiber optic loop coupler, a fiber optic loop, an oscillator, a PZT piezoelectric ceramic phase modulator, a photodetector diode and a demodulation/amplifier circuit.

The light source coupler, the superluminescent diode, the polarizer, the photodetector diode are coupled via signal; the fiber optic loop coupler, the polarizer and the fiber optic loop are coupled via signal; the demodulation/amplifier circuit and the photodetector diode are coupled via signal; the oscillator applies an AC voltage to the PZT piezoelectric phase modulator, and part of an end of the fiber optic loop is wound around an outer circle of the PZT piezoelectric ceramic phase modulator.

The present invention in one embodiment differs from the prior art mainly in that the gyroscope further comprises:

a phase reversal switch provided between the oscillator and the PZT piezoelectric ceramic phase modulator for controlling the polarity of the AC voltage;

a digital signal processor (DSP) chip coupled to the phase reversal switch and the demodulation/amplifier circuit via signal, which is used for:

outputting a square wave signal and controlling the phase reversal switch to reverse the polarity of the AC voltage applied to the PZT piezoelectric ceramic phase modulator according to a predetermined half-cycle time period; and calculating a half of the difference between output rotation rates of the gyroscope in two adjacent half-cycle periods as the output rotation rate of the gyroscope in said cycle according to the output signal of the demodulation/amplifier circuit and the phase of the square wave signal.

In comparison with the prior art, in the output angular velocity of the gyroscope at the time, the drift component is greatly decreased.

Other aspects of the technique will be apparent from the accompanying figures and detailed description.

DETAILED DESCRIPTION

The present invention is further explained in detail below with reference to the drawings.

Figure 1A:
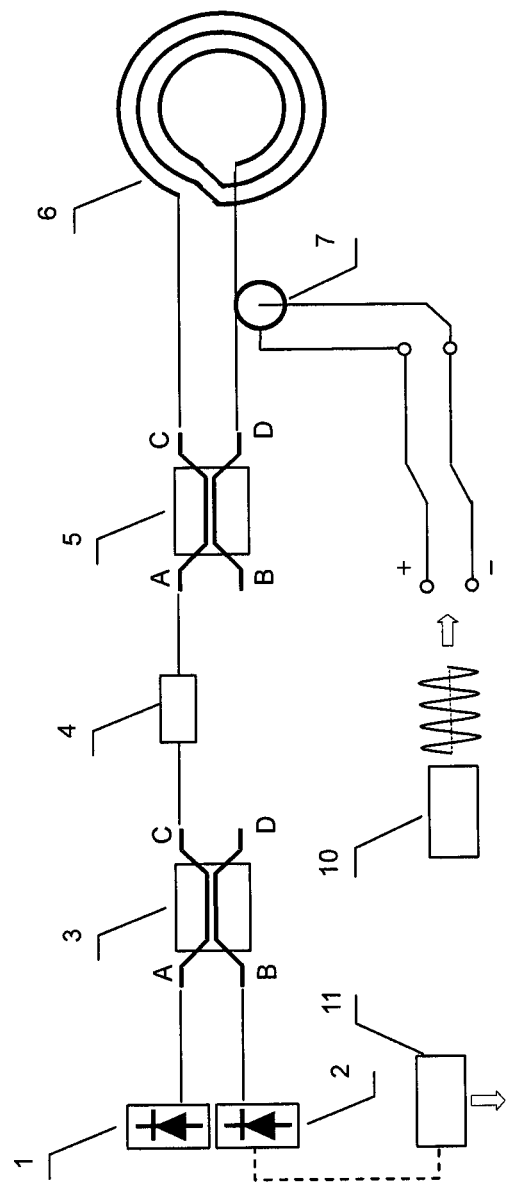
FIG. 1A is a block diagram of an all-fiber interferometric fiber optic gyroscope in the prior art and the embodiment of the present invention.
Figure 1B:
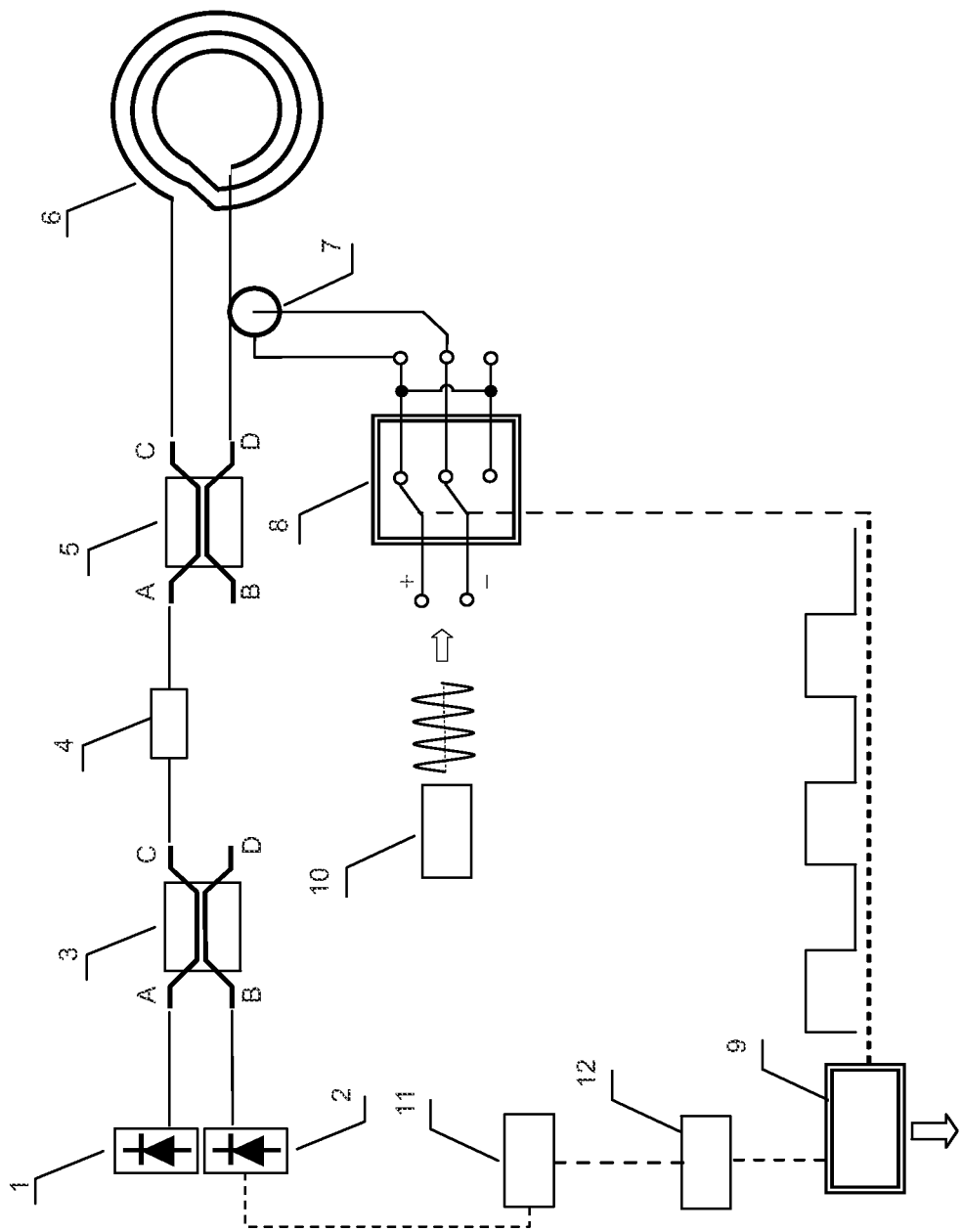
FIG. 1B is a block diagram of an all-fiber interferometric fiber optic gyroscope in accordance with the present invention.
Figure 2:
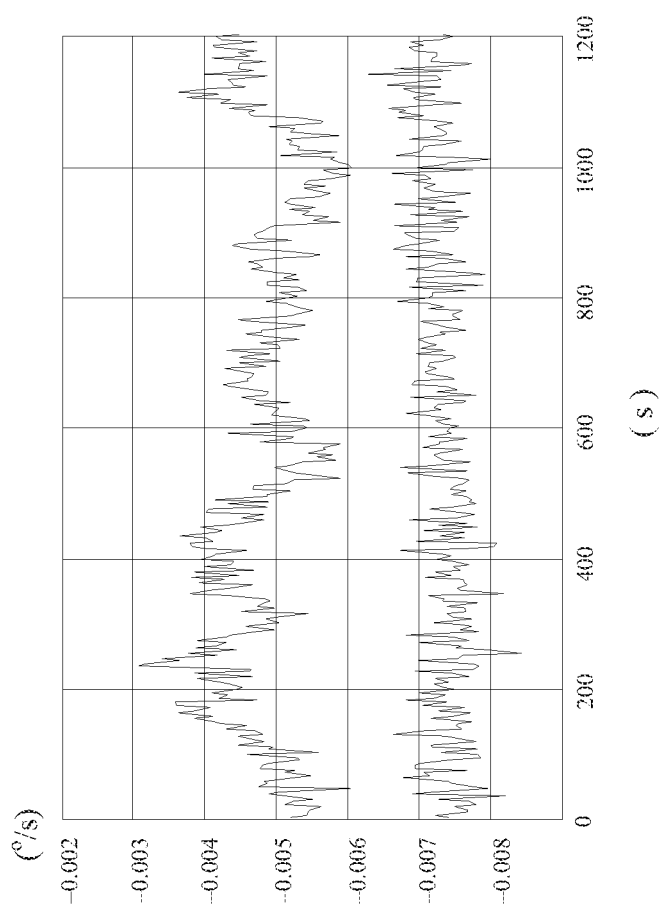
FIG. 2 shows a comparison between curves of the output angular velocity signal of an all-fiber fiber optic gyroscope before and after adopting the technology of the present invention.

As shown in FIG. 1B, the all-fiber interferometric fiber optic gyroscope of one embodiment of the present invention comprises two parts:

The first part is a typical all-fiber interferometric fiber optic gyroscope, comprising a superluminescent diode 1, a photodetector diode 2, a light source coupler 3, a polarizer 4; a fiber optic loop coupler 5, a fiber optic loop 6, an oscillator 10, and a demodulation/amplifier circuit 11.

The second part is a set of circuit units, comprising a PZT piezoelectric ceramic phase modulator 7, a phase reversal switch 8, a DSP chip 9 and an analog-to-digital (A/D) converter 12.

The PZT piezoelectric ceramic phase modulator 7 is a cylindrical sheet. Part of the optical fiber of the fiber optic loop (e.g., about 1 meter) is wound around and bonded to the outer circle of the ceramic phase modulator 7. The AC voltage signal on the PZT piezoelectric ceramic phase modulator 7 is generated by the oscillator 10, and the polarity of the AC voltage signal on the PZT piezoelectric ceramic phase modulator 7 is controlled by the high speed phase reversal switch 8, wherein the high speed phase reversal switch 8 is controlled by a square wave signal output from the DSP chip 9, and the DSP chip 9 also calculates and outputs the rotation rate signal of the gyroscope according to the output signal of the demodulation/amplifier circuit 11 and the phase of the square wave signal.

The main component of the zero drift of the gyroscope is independent of the polarity of AC voltage signal on the PZT piezoelectric ceramic phase modulator 7. Consequently, switching the polarity of the AC voltage signal changes the symbol of output rotation rates, and hardly influences the tendency or inclination of the zero drift. In a cycle with a polarity switch, assume that the output angular velocity of the gyroscope in the previous half-cycle time period is expressed as the quantity R+Δ, where R is the input (true) angular velocity of the gyroscope and Δ is the zero drift component of the output angular velocity. In the typical gyroscope, and in one embodiment of the invention, this quantity R+Δ is the output of the demodulation/amplifier circuit 11.

When the polarity of the AC voltage signal on the PZT piezoelectric ceramic phase modulator 7 is reversed, which corresponds to reversal of the direction of the input angular velocity of the gyroscope, since the drift component of the output angular velocity is independent of the input angular velocity of the gyroscope and the drift's change over time is slow, the output angular velocity of the gyroscope in the latter half-cycle period can be approximately expressed as −R+Δ. Therefore, in said cycle, the input angular velocity R can be obtained, exclusive of the drift component A, by dividing the difference quantity (R+Δ)−(−R+Δ) by 2. In contrast with the prior art, therefore, the drift component Δ in the output angular velocity of the gyroscope can be subtracted out by use of this formula. In one embodiment this calculation is done by the DSP chip 9. The DSP chip 9 receives as input the output angular velocity of the gyroscope from the demodulation/amplifier circuit 11, in digital form, via the A/D converter 12.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   inhibiting zero drift of an open loop interferometric fiber optic gyroscope by:
   reversing the polarity of a sinusoidal AC signal applied to a phase modulator of the open loop interferometric fiber optic gyroscope, according to a predetermined half-cycle time period, wherein the ratio of the cycle of polarity switching of the AC signal to the cycle of the AC signal is greater than 1000; and wherein reversing the polarity of the AC signal is controlled by a square wave signal;
   determining output rotation rates of the open loop interferometric fiber optic gyroscope in two adjacent half-cycles according to the output signal of a demodulation/amplifier circuit and the phase of the square wave signal; and
   calculating a final output rotation rate of the open loop interferometric fiber optic gyroscope in a cycle based on a difference between the determined output rotation rates of the open loop interferometric fiber optic gyroscope in the two adjacent half-cycles.

2. The method according to claim 1, wherein the output rotation rates of the gyroscope in the two adjacent half-cycles are determined by a demodulator/amplifier.

3. The method according to claim 1, wherein the phase modulator is a PZT piezoelectric ceramic phase modulator.

4. A method for inhibiting zero drift of an open loop interferometric fiber optic gyroscope, comprising:
   reversing the polarity of a sinusoidal AC voltage applied to a PZT piezoelectric ceramic phase modulator according to a predetermined half-cycle time period, wherein the ratio of the cycle of polarity switching of the AC signal to the cycle of the AC signal is greater than 1000; and wherein reversing the polarity of the AC signal is controlled by a square wave signal;
   determining output rotation rates of the open loop interferometric fiber optic gyroscope in two adjacent half-cycles according to the output signal of a demodulation/amplifier circuit and the phase of the square wave signal; and
   determining the output rotation rate of the open loop interferometric fiber optic gyroscope in a cycle to be equal to half of the difference between the output rotation rates of the open loop interferometric fiber optic gyroscope in two adjacent half-cycles.

5. The method according to claim 4, wherein the switch of the polarity of the AC voltage is realized by: a phase reversal switch that is provided between an oscillator for generating the AC voltage and the PZT piezoelectric ceramic phase modulator; wherein the phase reversal switch periodically switches the polarity of the AC voltage applied to the PZT piezoelectric ceramic phase modulator.

6. An open loop interferometric fiber optic gyroscope, comprising
   a first portion including a light source, a fiber optic loop and a photodetector, optically coupled to each other; and
   a circuit portion coupled to the first portion, the circuit portion including
      a piezoelectric phase modulator;
      a demodulator;
      an oscillator to apply a sinusoidal AC signal to the piezoelectric phase modulator;
      a phase reversal switch coupled between the oscillator and the piezoelectric phase modulator to control the polarity of the AC signal; and
      circuitry coupled to the phase reversal switch and the demodulator and configured to:
         output a square wave signal to control the phase reversal switch to reverse the polarity of the AC signal applied to the piezoelectric phase modulator according to a predetermined half-cycle time period, wherein the ratio of the cycle of polarity switching of the AC signal to the cycle of the AC signal is greater than 1000;
         determine output rotation rates of the open loop interferometric fiber optic gyroscope in two adjacent half-cycles according to the output signal of the demodulator and the phase of the square wave signal; and calculate an output rotation rate of the open loop interferometric fiber optic gyroscope in a cycle, based on an output of the demodulator, as a function of a difference between the output rotation rates of the open loop interferometric fiber optic gyroscope in two adjacent half-cycles.

7. The gyroscope according to claim 6, wherein the optical portion further comprises:
a light source coupler optically coupled to the light source;
a polarizer optically coupled to the light source; and
a fiber optic loop coupler optically coupled to the light source.

8. The gyroscope according to claim 6, wherein said circuitry is embodied in a digital signal processor chip.

9. An open loop interferometric fiber optic gyroscope, comprising
a superluminescent diode;
a light source coupler;
a polarizer;
a fiber optic loop coupler;
a fiber optic loop;
an oscillator;
a PZT piezoelectric ceramic phase modulator;
a photodetector diode;
a demodulation/amplifier circuit;
wherein the light source coupler, the superluminescent diode, the polarizer, the photodetector diode are coupled via signal; the fiber optic loop coupler, the polarizer and the fiber optic loop are coupled via signal; the demodulation/amplifier circuit and the photodetector diode are coupled via signal; the oscillator applies a sinusoidal AC voltage to the PZT piezoelectric phase modulator, and part of an end of the fiber optic loop is wound around an outer circle of the PZT piezoelectric ceramic phase modulator;
a phase reversal switch provided between the oscillator and the PZT piezoelectric ceramic phase modulator for controlling the polarity of the AC voltage; and
a DSP chip, coupled to the phase reversal switch and the demodulation/amplifier circuit via signal, which is used to:
output a square wave signal and control the phase reversal switch to reverse the polarity of the AC voltage applied to the PZT piezoelectric ceramic phase modulator according to a predetermined half-cycle time period, wherein the ratio of the cycle of polarity switching of the AC signal to the cycle of the AC signal is greater than 1000;
determine output rotation rates of the open loop interferometric fiber optic gyroscope in two adjacent half-cycles according to the output signal of the demodulation/amplifier circuit and the phase of the square wave signal;
and
calculate a half of the difference between the output rotation rates of the open loop interferometric fiber optic gyroscope in two adjacent half-cycles as an output rotation rate of the gyroscope in a cycle.

* * * * *